US008863590B2

(12) United States Patent
Watkins et al.

(10) Patent No.: US 8,863,590 B2
(45) Date of Patent: Oct. 21, 2014

(54) LARGE DIAMETER FLOW-THROUGH KIEL-STYLE PRESSURE PROBE FOR HIGH MOISTURE APPLICATIONS

(75) Inventors: Tonya Lynn Watkins, Troy, NY (US); Zachary John Snider, Simpsonville, SC (US); Tara Ashley Cole, Saratoga Springs, NY (US)

(73) Assignee: General Electric Company, Schenectady, NY (US)

(*) Notice: Subject to any disclaimer, the term of this patent is extended or adjusted under 35 U.S.C. 154(b) by 367 days.

(21) Appl. No.: 13/430,001

(22) Filed: Mar. 26, 2012

(65) Prior Publication Data
US 2013/0247686 A1 Sep. 26, 2013

(51) Int. Cl.
*G01F 1/46* (2006.01)
*G01D 21/00* (2006.01)

(52) U.S. Cl.
USPC ........................................ 73/861.65; 73/866.5

(58) Field of Classification Search
None
See application file for complete search history.

(56) References Cited

U.S. PATENT DOCUMENTS

| 2,397,084 | A | * | 3/1946 | Bernhardt | 228/161 |
|---|---|---|---|---|---|
| 4,433,584 | A | | 2/1984 | Kokoszka et al. | |
| 4,645,517 | A | * | 2/1987 | Hagen et al. | 73/182 |
| 4,730,487 | A | * | 3/1988 | DeLeo et al. | 73/182 |
| 5,046,360 | A | * | 9/1991 | Hedberg | 73/182 |
| 5,616,861 | A | * | 4/1997 | Hagen | 73/180 |
| 6,591,696 | B2 | * | 7/2003 | Bachinski | 73/861.65 |
| 6,892,584 | B2 | * | 5/2005 | Gilkison et al. | 73/736 |
| 2003/0010130 | A1 | * | 1/2003 | Bachinski | 73/747 |

\* cited by examiner

*Primary Examiner* — Harshad R Patel
(74) *Attorney, Agent, or Firm* — Nixon & Vanderhye, P.C.

(57) ABSTRACT

A Kiel-style pressure probe includes pressure tubing having a remote sending end, the pressure tubing extending through an open-ended shroud, wherein the shroud has a diameter of at least about 0.375 to 0.50 inch and wherein a forward end of the shroud is formed with at least two drainage apertures in proximity to the remote sensing tip of the pressure tubing.

20 Claims, 4 Drawing Sheets

LARGE DIAMETER FLOW-THROUGH KIEL-STYLE PRESSURE PROBE FOR HIGH MOISTURE APPLICATIONS

BACKGROUND OF THE INVENTION

The present invention relates generally to instrumentation used in turbine power plants and development test turbines and, more specifically, to a total-pressure probe effective in high-moisture conditions.

Total-pressure probes are often used to measure total pressure in a fluid environment where the direction of flow is not known or changes with operating conditions. Kiel-style probes have a straight flow-through design and are typically installed on cylindrical rake masts. These probes are mounted at various radial locations across a flow path, and pressure tubing is routed through the rake mast to a transducer where the pressure measurement is translated to a signal for routing to a data acquisition system.

The Kiel-style probe is a pitot-style probe but has a shroud to protect the pressure tubing. The shroud makes the probe insensitive to a range of yaw and pitch angles because the flow is straightened as it enters the probe. Kiel-style probes are sometimes installed in the exhaust duct of, for example, a low-pressure steam-turbine section during performance testing to measure the total pressure distribution exiting the last-stage row of buckets. U.S. Pat. No. 4,433,584 discloses a plurality of Kiel-style probes on a rake downstream of a turbine section, described in further detail below.

Measuring total pressure in a wet-steam environment, however, is often hampered by the development of water "legs" in the pressure tubing. Because of the long length of the pressure tubing, the length of the water legs is often unknown. Without this information, it is impossible to recalculate the correct pressure measurement. The exact mechanism by which water legs are formed is unknown, but one theory is that the wet steam impinges on the pressure tubing and is forced into the tubing. Dry air is often used to purge the pressure tubing of moisture, but the effects of adding a large amount of air to the exhaust can also affect the accuracy of the pressure measurements. It would therefore be desirable to develop a mechanism that more effectively prevents the build up of moisture in the pressure tubing and the attendant formation of water legs.

BRIEF SUMMARY OF THE INVENTION

In accordance with an exemplary but nonlimiting embodiment, there is provided a pressure probe comprising pressure tubing having a remote sending tip, the pressure tubing extending through an open-ended shroud, wherein the shroud has a diameter of at least about 0.375 to 0.50 inch and wherein a forward end of the open-ended shroud is formed with at least two drainage apertures in proximity to the remote sensing tip.

In still another aspect, there is provided a pressure probe assembly for use in a turbine inlet or exhaust duct comprising a rake mast adapted to extend substantially radially into the inlet or exhaust duct; and at least one pressure probe attached to the rake mast; wherein the pressure probe comprises a shroud; pressure tubing having a remote sending tip, the pressure tubing extending through the shroud, and wherein the shroud has a diameter of at least about 0.375 to 0.50 inch and wherein a forward end of the shroud is formed with at least two drainage apertures in proximity to the remote sensing tip.

In still another aspect, there is provided a pressure probe assembly for use in a turbine inlet or exhaust duct comprising a rake mast adapted to extend substantially radially into the inlet or exhaust duct; at least one pressure probe attached to the rake mast; wherein the pressure probe comprises pressure tubing having a remote sending tip facing opposite a flow direction within the turbine inlet or exhaust duct, the pressure tubing extending through an open-ended shroud, wherein the open-ended shroud has a diameter of at least about 0.375 to 0.50 inch and wherein a forward end of the open-ended shroud is formed with at least two drainage apertures in proximity to the remote sensing tip, the at least two drainage apertures having diameters of between about 0.20 and 0.25 inch.

The invention will now be described in detail in connection with the drawings identified below.

DETAILED DESCRIPTION OF THE INVENTION

Figure 1:
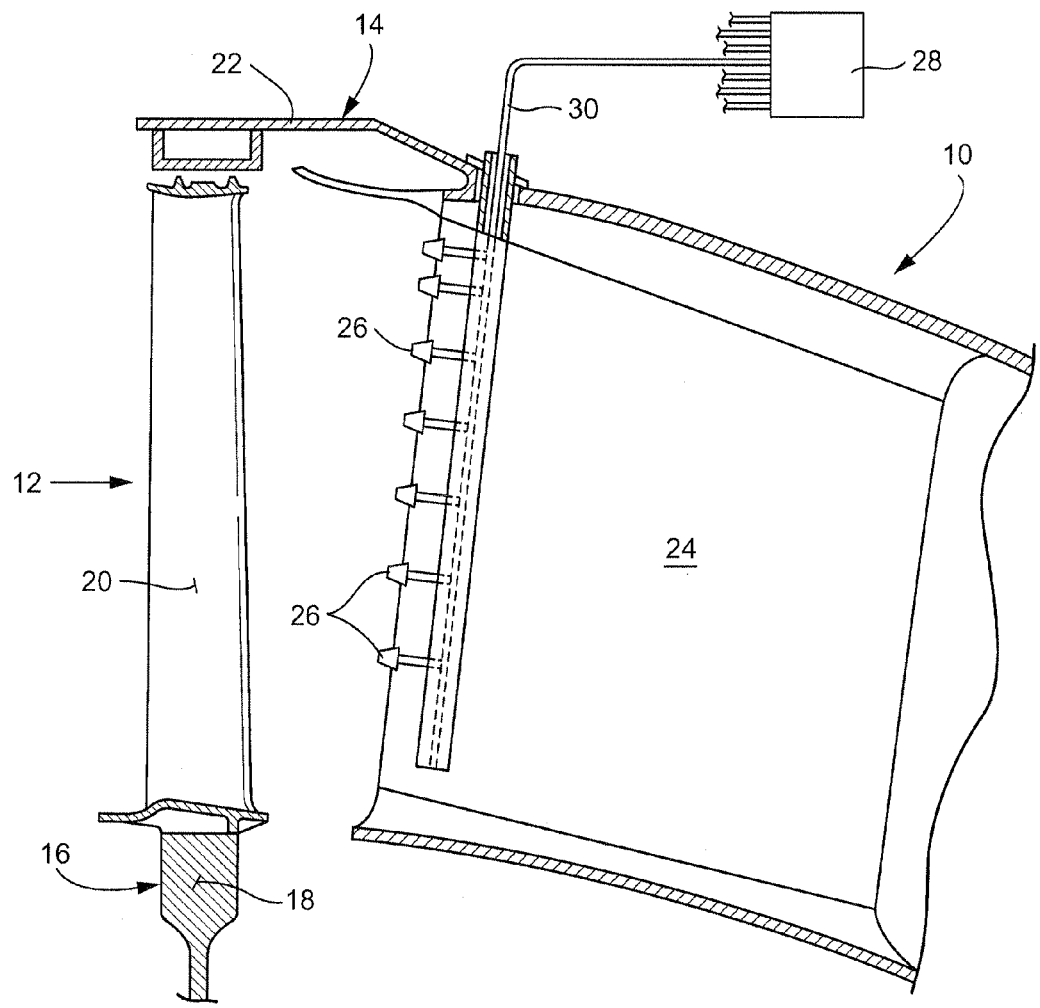
FIG. 1 is a partial cross-section of a turbine last stage in accordance with a known design, and showing a plurality of pressure probes located downstream of a turbine section.
Figure 2:
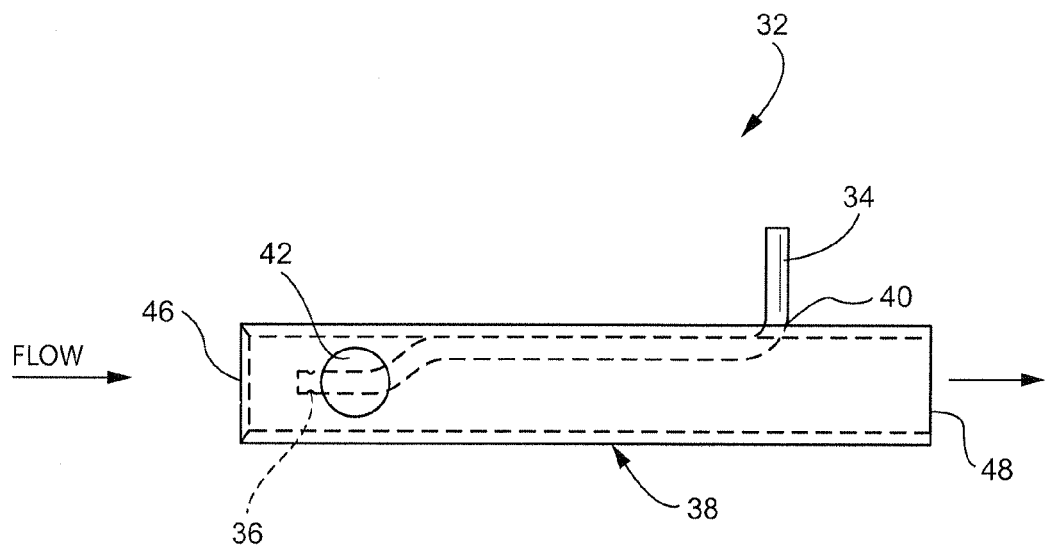
FIG. 2 is a side elevation, partly in section, showing a total-pressure probe in accordance with an exemplary but nonlimiting embodiment of the invention.
Figure 3:
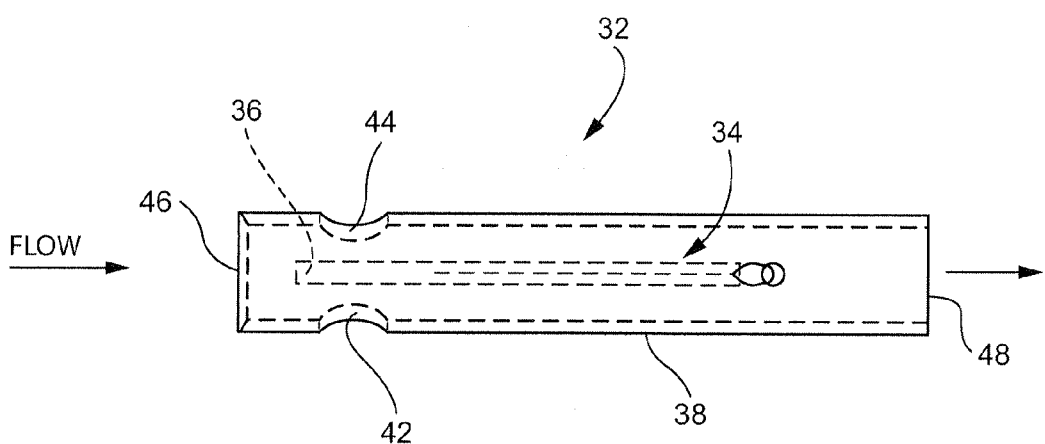
FIG. 3 is a plan view of the pressure probe shown in FIG. 2.
Figure 4:
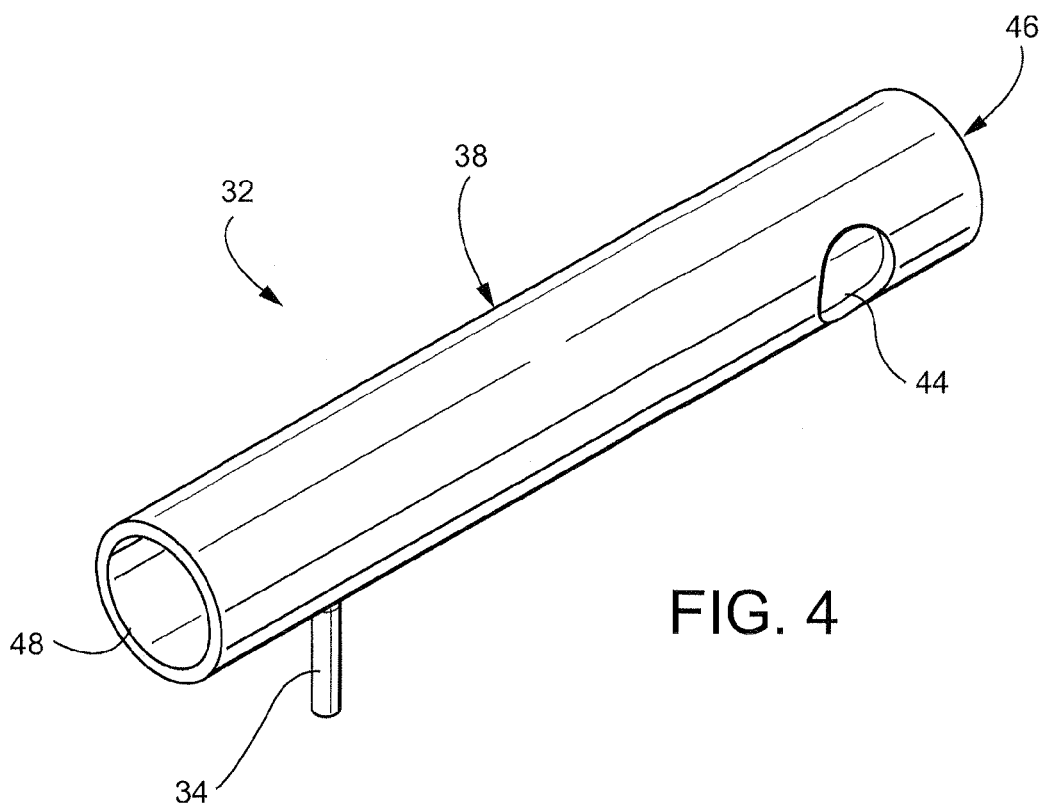
FIG. 4 is a perspective view of the probe shroud isolated from FIGS. 2 and 3.
Figure 5:
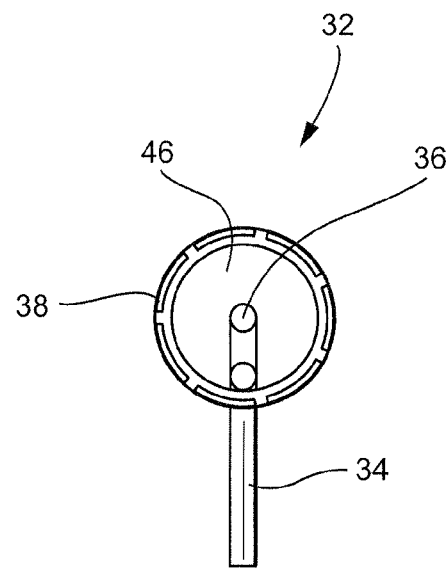
FIG. 5 is a front-end view of the pressure probe shown in FIG. 4.

FIG. 1 is a simplified cross-section of a last-stage turbine section as described as disclosed in U.S. Pat. No. 4,433,584, illustrating a known arrangement of a pressure probe rake located in the turbine exhaust. More specifically, the engine has a turbine section 10 (partially shown) and a flow path 12 for process gases which flow axially through the turbine section to the exhaust duct. The turbine section 10 has a stator assembly 14 and a rotor assembly 16. The rotor assembly includes a rotor disk 18 fitted with a plurality of radially-outwardly extending blades or buckets as represented by the single bucket 20. The stator assembly includes an outer casing 22 which circumscribes the turbine section and flow path. In this example, a plurality of stator struts 24 (one shown) extend radially inwardly from the outer casing across the flow path. The strut 24 has a plurality of total pressure probes 26 incorporated into the strut. Each total pressure probe 26 is in fluid communication with a transducer 28 for converting total pressure levels into an analog or digital output. Each probe 26 includes a pressure tube 30 extending between the tip of the pressure probe 26 and the transducer (only one shown for ease of understanding).

With reference now to FIGS. 2-5, a modified Kiel-type probe in according with an exemplary but nonlimiting embodiment of this invention is shown at 32. The probe comprises pressure tubing 34 having a remote pressure sensing tip 36, received with an enlarged, substantially cylindrical shroud 38 through an aperture 40 in the shroud sidewall, and terminating proximate the forward opening 46 of the shroud. The otherwise conventional sensing tip 36 of the probe 32 is centered within the shroud 38 from a location slightly forward of the apertures 42, 44 (axially, as viewed in FIG. 2) to a location just behind the apertures. The tubing 34 is then routed within along the interior sidewall of the shroud as best appreciated from FIGS. 2 and 5. The apertures 42, 44 are formed at diametrically-opposed locations, adjacent the tip 36 of the probe 32, the shroud 38. It will be understood that the probe 32 could also extend through the rearward end 48 of the shroud, depending on how the probe is attached to an associated rake or rake mast, described further below.

In the exemplary embodiment, the shroud may extend beyond the sensing tip 36 of the probe 32 about 0.19 inch and the apertures 42, 44 are spaced rearwardly of the tip 36, such that the diametrical centers of the apertures are located about 0.38 inch behind the forward opening 46 of the shroud. As made apparent from the description above, the apertures 42, 44 also span at least the entire axial length of that part of the pressure tubing 34 that is centered within the shroud.

By enlarging the diameter of the shroud 38 and by providing larger-diameter drainage holes 42, 44 adjacent the probe tip, any water droplets forming on the interior wall of the shroud 38 will pass through the apertures 42, 44 and/or flow through the shroud 38 and exit the open rearward end 48, thereby preventing the development of water legs in the pressure tubing 34, and thus improving the accuracy of the pressure readings.

Figure 6:
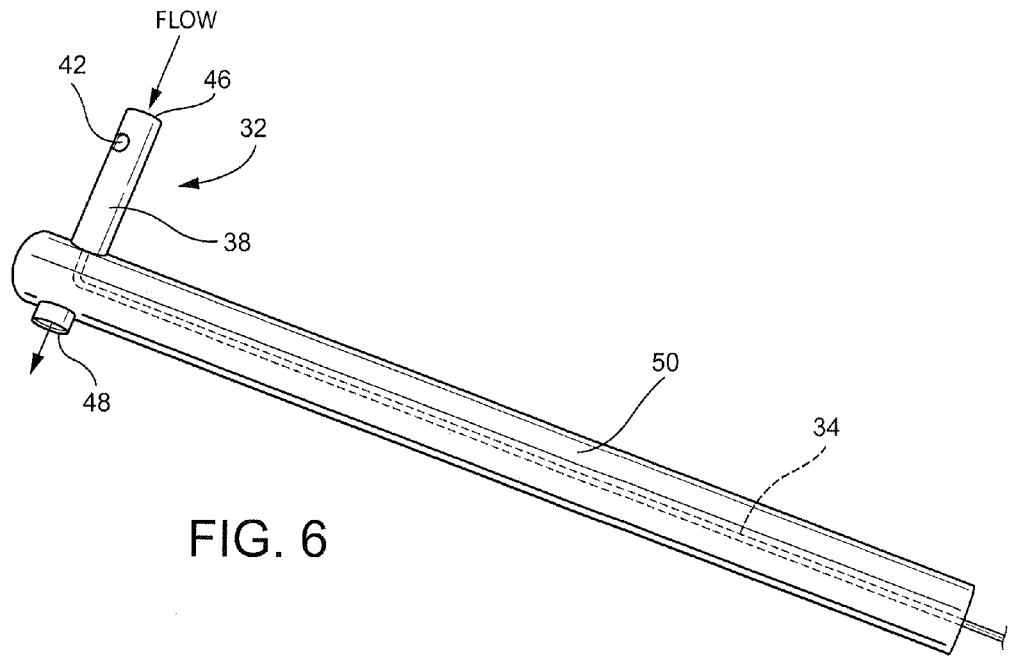
FIG. 6 is a perspective view of a probe as shown in FIGS. 2-5 installed in an instrument rake.
Figure 7:
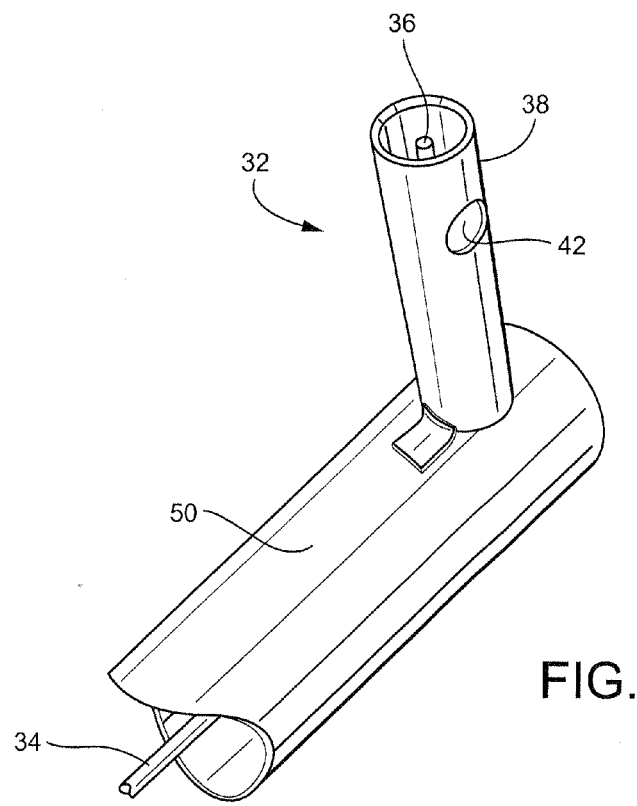
FIG. 7 is an enlarged detail taken from FIG. 6 but from a different perspective.

FIGS. 6 and 7 show the probe/shroud assembly attached to a rake mast 50 that allows the probe, and other similar probes (not shown), to be arranged at radially-spaced locations within or adjacent an inlet to a duct, similar to the arrangement in FIG. 1. In a flow-through probe design, the open, rearward end 48 of the shroud 38 may pass through the rake mast 50 (see FIG. 6). In a closed design, the open, rearward end 48 of the shroud 38 is located within the rake mast, and any moisture flowing axially through and exiting the shroud 38 can exit the radially-inner end of the rake mast 50. While the probe is shown extending at an angle of substantially ninety degrees relative to the mast, the angle may vary with specific applications. As in a conventional set-up, the sensing tip 36 faces opposite the flow direction through the duct.

In the exemplary but nonlimiting embodiment, the diameter of the shroud may be in the range of about 0.375-0.50 inch, as compared to a conventional diameter of 0.0625-0.25 inch, i.e., about twice the diameter of conventional probes. The wall thickness of the shroud may be, for example, about 0.07 inch. In the exemplary but nonlimiting embodiment, the apertures 42, 44 may have diameters of between about 0.20 and 0.25 inch. As will be appreciated by those skilled in the art, the shroud diameters may be varied with specific applications, but in all cases, are significantly larger than the above-noted conventional shroud diameters. Further in this regard, the smaller-diameter shrouds may be more appropriate for development testing turbines, while larger-diameter shrouds may be better suited to field applications.

In addition, one or both of the apertures 42, 44 may be drilled or otherwise formed so as to slant in the rearward direction to facilitate moisture drainage.

The described arrangement substantially inhibits if not eliminates the formation of water legs within the pressure tubing 34, thereby enhancing the accuracy of the recorded pressure measurements.

It will be appreciated that the probe described herein is not limited to use or the turbine exhaust duct, but may also be used within the turbine air inlet.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure probe comprising:
pressure tubing having a remote sensing tip, said pressure tubing extending through an open-ended shroud, wherein said sensing tip is positioned within the shroud such that an unobstructed oncoming flow entering the shroud is directed parallel to the sensing tip as the flow is entering the pressure probe and said shroud is hollow and has a diameter of at least 0.375 to 0.50 inch; and wherein a forward end of said open-ended shroud is formed with at least two drainage apertures in proximity to said remote sensing tip.

2. The pressure probe of claim 1 wherein said at least two drainage apertures are substantially diametrically opposed.

3. The pressure probe of claim 1 wherein said at least two drainage apertures are substantially round.

4. The pressure probe of claim 3 wherein each of said apertures has a diameter of between 0.20 and 0.25 inches.

5. The pressure probe of claim 1 wherein said shroud is attached to a rake mast extending substantially 90° relative to said shroud.

6. The pressure probe of claim 1 wherein said pressure tubing enters said shroud at a location proximate a rearward end of said shroud.

7. The pressure probe of claim 1 wherein said shroud has an open rearward end, and said pressure tubing exits said shroud through an aperture proximate said open rearward end.

8. A pressure probe assembly for use in a turbine inlet or exhaust duct comprising:
a rake mast adapted to extend substantially radially into the inlet or exhaust duct; and
at least one pressure probe attached to said rake mast; wherein the pressure probe comprises a shroud; pressure tubing having a remote sensing tip, said pressure tubing extending through said shroud; and wherein said tip is positioned within the shroud such that an unobstructed oncoming flow is directed parallel to the sensing tip as the flow is entering the pressure probe and said shroud is hollow and has a diameter of at least 0.375 to 0.50 inch, and wherein a forward end of said shroud is formed with at least two drainage apertures in proximity to said remote sensing tip.

9. The pressure probe assembly of claim 8 wherein said at least two drainage apertures are substantially diametrically opposed.

10. The pressure probe assembly of claim 8 wherein said at least two drainage apertures are substantially round.

11. The pressure probe assembly of claim 10 wherein each of said apertures has a diameter of between 0.20 and 0.25.

12. The pressure probe assembly of claim 8 wherein said shroud extends substantially perpendicularly relative to said rake mast.

13. The pressure probe assembly of claim 8 wherein said pressure tubing enters said shroud at a location proximate a rearward end of said shroud.

14. The pressure probe assembly of claim 8 wherein said shroud has an open rearward end, and said pressure tubing exits said shroud through an aperture proximate said open rearward end.

15. A pressure probe assembly for use in a turbine inlet or exhaust duct comprising:
a rake mast adapted to extend substantially radially into the inlet or exhaust duct;

at least one pressure probe attached to said rake mast; wherein the pressure probe comprises pressure tubing having a remote sensing tip facing opposite a flow direction within the turbine inlet or exhaust duct, said pressure tubing extending through an open-ended shroud, wherein said sensing tip is positioned within the shroud such that an unobstructed oncoming flow is directed parallel to the sensing tip as the flow is entering the pressure probe and said open-ended shroud is hollow and has a diameter of at least 0.375 to 0.50 inch, and wherein a forward end of said open-ended shroud is formed with at least two drainage apertures in proximity to said remote sensing tip, said at least two drainage apertures having diameters of between 0.20 and 0.25 inch.

16. The pressure probe assembly of claim 15 wherein a forward end portion of the pressure tubing is centered within the shroud, and another portion of the pressure tubing extends axially along an interior wall surface of the shroud.

17. The pressure probe assembly of claim 16 wherein said diameter of said drainage apertures is at least equal to an axial length of said forward end portion of said pressure tubing.

18. The pressure probe assembly of claim 16 wherein an open rearward end of said shroud extends beyond said rake mast.

19. The pressure probe assembly of claim 15 wherein a sensing tip of the pressure tubing lies rearwardly of a forward open end of the shroud.

20. The pressure probe assembly of claim 15 wherein said pressure tubing exits said shroud at a location axially-spaced from a rearward end of said shroud.

\* \* \* \* \*

UNITED STATES PATENT AND TRADEMARK OFFICE
CERTIFICATE OF CORRECTION

PATENT NO.        : 8,863,590 B2                              Page 1 of 1
APPLICATION NO.   : 13/430001
DATED             : October 21, 2014
INVENTOR(S)       : Tonya Lynn Watkins et al.

It is certified that error appears in the above-identified patent and that said Letters Patent is hereby corrected as shown below:

On the Title Page, Item (54) Title and in the Specification, Column 1, line 1-3, delete the term "Pressure" from the title. The Patent title should read as follows "Large Diameter Flow-Through Kiel-Style Probe for High Moisture Applications."

In the Claims
At Column 4, line 39, insert --sensing-- between "and wherein said" and "tip is positioned within the shroud"

Signed and Sealed this
Twenty-seventh Day of January, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,863,590 B2
APPLICATION NO. : 13/430001
DATED : October 21, 2014
INVENTOR(S) : Watkins et al.

Page 1 of 1

It is certified that error appears in the above-identified patent and that said Letters Patent is hereby corrected as shown below:

On the Title Page, in Item (57), under "ABSTRACT", in Column 2, Line 1,
delete "pressure probe" and insert -- probe --, therefor.

In the Claims

In Column 4, Line 53, in Claim 4, delete "0.25." and insert -- 0.25 inches. --, therefor.

Signed and Sealed this
Twenty-ninth Day of September, 2015

Michelle K. Lee
*Director of the United States Patent and Trademark Office*